US010043030B1

(12) United States Patent
Kruse et al.

(10) Patent No.: US 10,043,030 B1
(45) Date of Patent: Aug. 7, 2018

(54) LARGE-SCALE AUTHORIZATION DATA COLLECTION AND AGGREGATION

(71) Applicant: Amazon Technologies, Inc., Seattle, WA (US)

(72) Inventors: William Frederick Hingle Kruse, Seattle, WA (US); Ashish Rangole, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 540 days.

(21) Appl. No.: 14/615,347

(22) Filed: Feb. 5, 2015

(51) Int. Cl.
*G06F 17/30* (2006.01)
*G06F 21/62* (2013.01)
*G06Q 10/06* (2012.01)

(52) U.S. Cl.
CPC .... *G06F 21/6227* (2013.01); *G06F 17/30289* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 7,290,275 B2 | 10/2007 | Baudoin et al. | |
| 8,074,256 B2 | 12/2011 | Valente et al. | |
| 8,141,125 B2 | 3/2012 | Maes | |
| 8,176,527 B1 * | 5/2012 | Njemanze | G06F 21/554 709/223 |
| 8,266,673 B2 | 9/2012 | Hu et al. | |
| 8,290,841 B2 | 10/2012 | Beigi et al. | |
| 8,434,126 B1 | 4/2013 | Schepis et al. | |
| 8,560,836 B2 | 10/2013 | Roegner | |
| 8,621,552 B1 | 12/2013 | Lotem et al. | |
| 9,106,687 B1 * | 8/2015 | Sawhney | H04L 63/1416 |
| 9,626,328 B1 * | 4/2017 | Kumar | G06F 15/163 |
| 2002/0147801 A1 | 10/2002 | Gullotta et al. | |
| 2003/0088786 A1 | 5/2003 | Moran et al. | |
| 2003/0110397 A1 | 6/2003 | Supramaniam et al. | |
| 2003/0226038 A1 * | 12/2003 | Raanan | G06F 21/604 726/1 |
| 2004/0181476 A1 | 9/2004 | Smith et al. | |
| 2004/0205342 A1 | 10/2004 | Roegner | |
| 2004/0260947 A1 * | 12/2004 | Brady | H04L 63/1425 726/23 |
| 2005/0010819 A1 | 1/2005 | Williams et al. | |
| 2006/0143685 A1 | 6/2006 | Vasishth et al. | |
| 2007/0136814 A1 | 6/2007 | Lee et al. | |
| 2007/0157287 A1 | 7/2007 | Lim | |
| 2007/0180490 A1 | 8/2007 | Renzi et al. | |
| 2009/0205016 A1 | 8/2009 | Milas | |
| 2011/0125894 A1 | 5/2011 | Anderson et al. | |
| 2011/0197254 A1 | 8/2011 | Sallaka et al. | |

(Continued)

*Primary Examiner* — Richard Bowen
(74) *Attorney, Agent, or Firm* — Davis Wright Tremaine LLP

(57) ABSTRACT

Techniques for large-scale authorization data collection and aggregation are disclosed herein. An authorization data service may first receive a set of usage data records, may next aggregate the set of usage data records to reduce the number of usage data records, may next store the aggregated set of usage data records in a usage data repository, and may next provide subsets of the aggregated set of usage data records in response to an application processing request to inform policy decisions associated with a computer system.

22 Claims, 10 Drawing Sheets

(56) References Cited

U.S. PATENT DOCUMENTS

| | | |
|---|---|---|
| 2012/0124643 A1 | 5/2012 | Moriconi et al. |
| 2012/0216243 A1 | 8/2012 | Gill et al. |
| 2013/0117847 A1* | 5/2013 | Friedman .............. H04L 63/102 726/22 |
| 2013/0179938 A1 | 7/2013 | Choi et al. |
| 2013/0198811 A1* | 8/2013 | Yu ........................... H04L 63/08 726/4 |
| 2013/0291115 A1* | 10/2013 | Chong ............... G05B 19/4185 726/25 |
| 2014/0040979 A1 | 2/2014 | Barton et al. |
| 2014/0156588 A1* | 6/2014 | Mohanty .......... G06F 17/30592 707/600 |
| 2014/0196103 A1 | 7/2014 | Chari et al. |
| 2014/0196104 A1* | 7/2014 | Chari .................... H04L 63/102 726/1 |
| 2014/0359692 A1* | 12/2014 | Chari ..................... H04L 63/20 726/1 |
| 2014/0379915 A1 | 12/2014 | Yang et al. |
| 2015/0082377 A1* | 3/2015 | Chari ..................... H04L 63/20 726/1 |
| 2016/0044035 A1 | 2/2016 | Huang |
| 2016/0080399 A1 | 3/2016 | Harris et al. |

* cited by examiner

LARGE-SCALE AUTHORIZATION DATA COLLECTION AND AGGREGATION

BACKGROUND

Modern computer systems place a high importance on security of user access to system resources and on maintaining current and accurate polices for the permissions of computer system users to access those system resources. Resource owners, and other administrators of resources, often use such access control policies to control access by computer system users to computing resources in order to support the business needs of the resource owners, administrators, and users. In a computer system where many users may have several assigned roles, permissions, or policies associated with and relating to many different computing resources, maintaining user roles, permissions, or policies can grow increasingly complex, particularly as the size and/or complexity of the system or the number of computer system users increases leading to a corresponding increase in the amount of policy usage data.

Accordingly, a resource owner may grant access to resources in order to perform one or more actions on behalf of the resource owner while simultaneously ensuring the security of resources. In order to manage user privileges, a resource owner may delegate authority to access a given resource in a multiplicity of different ways to allow varying levels of access to the resource according to resource access policies. A principal (or set of principals) that are authorized by the delegation of authority to access the given resource may be referred to herein as "authorized delegates." Generally, in large-scale and other computing environments, changes in users, permissions, policies, or roles can make determining who has the ability to perform a given action on a resource, at a given time, a challenging problem and keeping such access policies current and secure can present further challenges. The scope of the data that may be collected may present a further challenging problem, both with respect to storing the data as well as with respect to retrieving the data. Further, the goals of keeping privileges current and secure can compete with other goals. A centralized system for managing privileges can, for example, become out of date, become over-inclusive, become under-inclusive, or fail to adjust to changing system needs as the size of the data stored increases. Further, with such complex systems, it is often not clear how changes to policies can affect the systems' operation. An administrator with permissions for modifying policies, for example, can inadvertently add unneeded permissions (resulting in a corresponding decrease in security) and/or remove needed permissions (potentially causing legitimate attempts to access resources to fail and/or causing a system to malfunction).

BRIEF DESCRIPTION OF THE DRAWINGS

Various embodiments in accordance with the present disclosure will be described with reference to the drawings, in which.

DETAILED DESCRIPTION

Figure 1:
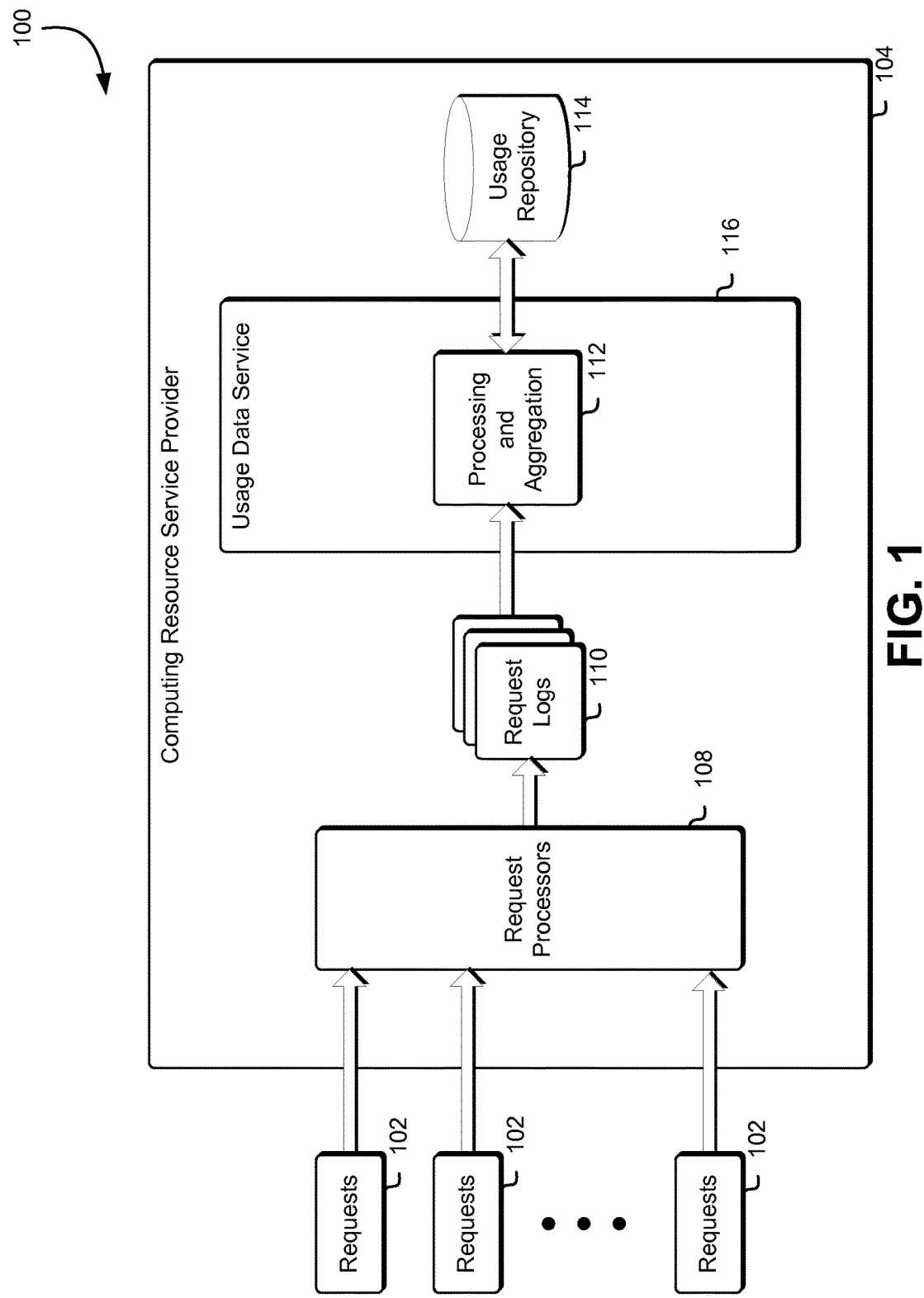
FIG. 1 illustrates an example environment in which authorization data may be collected and aggregated in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and processes for collecting, processing, and aggregating large-scale authorization data in computer systems for use by a policy management service to manage responsibilities, permissions, roles, and/or policies associated with the access to computing resources. A policy management service, or another service operating in conjunction with the policy management service, may collect access control data (e.g., data indicating what requests have been made and which privileges were invoked by those requests) associated with computing resources. The service may filter, process, aggregate, and compress such data for storage in an authorization data repository. The data may then be retrieved from the authorization data repository and used to, for example, improve authorization policies, generate warnings associated with policy changes, generate suggestions associated with policies, or other such activities associated with authorization policies.

In an embodiment, a policy management service may evaluate policies using access control usage data that has been produced by collecting, processing, and aggregating large-scale authorization data. Such access control usage data may comprise records and/or metadata elements that are associated with requests for access to resources that may, in turn, be based on one or more permissions associated with one or more policies. For example, with a set of permissions for a user USER1, a request by USER1 to read from resource 12345 may cause the policy management service (or an entity associated with the policy management service) to generate an access control usage data record of such a request. The data record may also indicate that the request was allowed. Similarly, a request by USER1 to write to resource 12345 outside of permitted times (i.e., if USER1 is only allowed to write to resource 12345 at certain times) may cause the policy management service to generate an access control usage data of such a request, that the request was denied, and the reason that the request was denied.

Such access control usage records may be collected, processed, aggregated, and stored as aggregate usage records in a usage repository associated with the policy management service in a form that is usable by the policy management service to evaluate and/or improve the functioning of the policy management service. In one example, the access control usage records may be used to improve access control policies by generating recommended policy modifications based on the access control usage data. In such an example, repeated daily requests by USER1 to write to resource 12345 at around 9:45 AM (which could all be denied in this example) may be aggregated to produce aggregated data or aggregated usage records indicating that the required permission is not present based on the access control usage data. Aggregated usage records may be aggregated based on one or more common permissions (e.g., multiple records implicating the same permission may be aggregated into a single aggregated usage record). Aggregated usage records may also be aggregated based on one or more common permission elements (e.g., multiple records sharing the same principal, resource, action, condition, and/or effect may be aggregated into a single aggregated usage record). Based on this data, the policy management service may generate a permission modification recommendation that USER1 be granted write access to resource 12345 until a time after 9:45 AM (or another time, such as 15 minutes before 9:45 AM to allow for variations in submission time). In another example, the access control usage records may be used to issue warnings and/or make suggestions in response to proposed policy modifications based on the access control usage data. In such an example, if USER1 had been granted write access to resource 12345 until a time after 9:45 AM (or another time, such as 15 minutes before 9:45 AM to allow for variations in submission time) and an administrator had attempted to remove this permission, the policy management service may generate a warning about removing that permission. As may be contemplated, the examples described herein are merely illustrative and other ways of collecting, processing, aggregating, and storing usage data may be used by a policy management service and, as such, are considered to be within the scope of the present disclosure.

In a large-scale computer system, authorization data may rapidly grow in size. For example, a system with several thousand principals (i.e., users, services, processes, applications, modules, or the like) accessing hundreds of different services may, over the course of a single day, generate millions of requests for access to resources. Storing such data may present a problem, but retrieving such data so that it may be used to inform policy management recommendations such as those described herein may be more problematic. However, by processing and aggregating the data, the data may be stored and retrieved in a more useful manner. Aggregating common authorization data together may make storing and retrieving such data more efficient or useful. For example, multiple records indicating that USER1 requested write access to resource 12345 and that such access was granted can be replaced by a single record indicating that USER1 requested write access to resource 12345 and that such access was granted with a counter indicating the number of times. In some embodiments, the single record may also include other metadata elements associated with the resource requests including, but not limited to, the internet protocol ("IP") address of the access, the time of the last access, or other such metadata elements. In another example, a user may make multiple requests to the same resource, each of which may generate a record. However, the requests may be for access to different objects contained by the resource (i.e., the resource may be a data storage resource and the objects may be different files, file systems, or locations within the data storage resource). In such an example, the multiple records may be aggregated to a single aggregated request (also referred to herein as an "aggregated usage record") for access to the resource in the event that access to the individual objects is not required data.

Filtering authorization data may also make storing and retrieving such data more efficient by removing unnecessary or irrelevant records and also by emphasizing necessary, more relevant, or more important records. For example, each instance of a principal accessing a certain network may not be of interest if the network does not provide access to secure resources. Such authorization request records may be filtered either at the source, as they are processed, as they are stored, and/or as they are retrieved. In another example, each instance of a principal accessing a sensitive and/or secure resource may be of interest and may be filtered so that such authorization request records are flagged for additional processing, not aggregated, not compressed, and so on. In some embodiments, filtering may include removing all or part of a record, may also include adding new data and/or metadata to a record, and/or may include forwarding a record for further processing and/or analysis. Such authorization request records may be filtered according to one or more filtering rules. For example, filtering rules may specify that any data read requests from a class of resources may be ignored (i.e., not forwarded for processing), or that ninety-nine percent of data write requests to a resource may be ignored and that the other one percent of the data write requests may be forwarded for processing.

FIG. 1 is an illustrative example of an environment 100 in which authorization data may be collected and aggregated in accordance with an embodiment. Authorization data (also referred to herein as "usage data") is data related to requests for usage of resources of a computer system. Such requests for usage may be evaluated using access control policies associated with that request. Access control policies are collections of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345.

Access control policies are collections of permissions associated with a user, a group, a role, an organization, a company, or some other such entity. Each permission may be associated with a computing resource and may specify whether the entity (also referred to herein as a "principal")

may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345.

Access control policies may be maintained by a policy management service and may be stored in a policy repository. In an embodiment, a user with privileges for modifying permissions and/or for modifying a set of policies (e.g., an administrator or such other user with privileges for modifying a set of policies, also referred to herein as a "privileged user") of an organization may communicate with the policy management service using one or more API calls to request creation of policies, editing of policies, or deletion of policies. Such policy modification activities (e.g., creating and editing) may also be referred to herein as "authoring" a policy. The policies may, for example, be utilized to establish, for one or more users, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Access control policies may be authored in a default state such as, for example, denying all access or granting all access. Access control policies may also be authored based on organizational business needs and/or may be based on roles within that organization so that, for example, all software developers have the same access control policy. Access control policies may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or sub-optimal for some other reason.

The request processors 108 may be associated with one or more services may be one or more of a plurality of services provided by a computing resource service provider 104. For example, each of a plurality of services provided by a computing resource service provider 104 may have an associated request processor configured to receive resource requests and log such requests in a plurality of request logs 110. In some embodiments, the request processors may be elements of a distributed computer system configured to centrally receive resource requests associated with a plurality of services operated by the computing resource service provider 104. Requests 102 for access to service resources (i.e., requests whose fulfillment involves access to the resources themselves and/or information about the resources) may be evaluated against one or more policies associated with the request and/or associated with the requester and those requests that are allowable based on those polices may be performed. The requests 102 may come from a plurality of principals as described herein. In the example illustrated in FIG. 1, request processors 108 may receive the requests 102 and may respond to such requests 102 according to the policies. API calls to create, edit, and/or delete policies may also be received by the request processors and/or may be forwarded to a policy management service as described herein. As policies may change, so too may the scope of requests that are allowable change.

For example, an organization may have a default policy allowing reads from all storage resources of a certain class. Barring a specific policy restricting a certain user from performing such reads, the default policy would permit such reads by any user. A change to a default policy preventing all reads from that class of storage resource may prevent that certain user from reading from such resources, and may require that specific permissions be granted if that user required that access. Granting such permissions may require that the policy be edited to change the permissions. In some embodiments, actions that are attempted (e.g., reads from a storage resource) may be logged in one or more request logs 110 along with details about the request including, but not limited to, the requester, the resource, the action, the result, and any conditions, decisions, or other metadata elements associated with the request.

In addition to being processed by the request processors 108, the requests 102 for access to computing resources may be logged in one or more request logs 110. The resource usage data in the request logs 110 may be produced based at least in part on one or more requests for access to computing resources. As an example of how requests may be logged in a request logs 110, a user may (e.g., through API calls) submit requests to cause the computing resource service provider to perform one or more operations involving access to a storage resource (e.g., virtual storage device or file system) associated with a computer system provided by a computing resource service provider 104, where access to the storage resource may involve the storage resource itself and/or information associated with the storage resource. In the example illustrated in FIG. 1, the request logs 110 are shown as within the computing resource service provider 104. In some embodiments, the request logs 110 may be located outside of the computing resource service provider 104 and may, for example, be located within an external environment and/or may be provided as part of another service provided by a customer of the computing resource service provider 104. Requests for resource usage data from the request log may be transmitted as queries, and such queries may be based on the proposed policy changes. For example, a policy change that would add access for a principal to a resource may cause a policy management service to query the request log for usage data implicated by that permission (i.e., usage data associated with that principal's access to that resource). In another example, usage data may be implicated by a permission if there is no permission to allow the request, or because there is a permission to grant the request but the permission may not be granted because of other conditions, or because there is a permission to grant the request and the permission is granted. The results of such queries may be provided in one or more data structures and may be optimized for searching as described herein.

With the example of a file system, the requests may include, for example, a request to list the contents of a file system on the storage resource, a request to change to a subdirectory of the file system, a request to read the contents of a file stored in the subdirectory, and a request to make a change to the contents of that file. Each request may be logged in one or more request logs 110. Each request log entry may specify the requester (e.g., a principal that authorized the request), the resource, the operation (e.g., list the contents of the file system, change to the subdirectory, the file read, and the file write), the permissions associated with the request, conditions relevant to the permissions, and the result of the request (i.e., whether it was allowed, denied, or there was some other result). In some embodiments, the request logs 110 may be stored local to the principal (e.g., may be stored in locations accessible by a requesting service principal). In some embodiments, the request logs 110 may be stored in multiple locations and/or may be distributed across one or more computer systems or services.

When a principal generates one or more requests 102 to access a computer system resource, those requests 102 may be evaluated against the access control policies to determine whether the request should be allowed or denied (i.e., whether the entity is authorized for such access). The usage policies, which may be aggregations of permissions associated with whether a computer system user, process, or other such entity (also referred to herein as a "principal") is authorized to access one or more resources of the computer system. For example, a policy may specify that a principal only has read access (i.e., only has permission to read from) to a class of storage devices. A request by the principal to read from a storage device of that class may be evaluated against that policy and the request may be allowed. By contrast, a request by the principal to write to a storage device of that class may be evaluated against that policy and the request may be denied. Usage data is data associated with each of those requests and may include, for example, the request, the principal, the resource, the application programming interface ("API") call used to generate the request, the result of the request, the date and/or time of the request, or other data or metadata associated with the request.

Data stored in the request logs 110 may then be forwarded for processing and aggregation 112 by a usage data service 116 as described herein and such processed and aggregated data may then be stored in a usage repository 114 also as described herein. In an embodiment, the data stored in the request logs 110 may be a subset of event records which may be records generated in response to the requests 102. In such an embodiment, the event records may be received by an event publishing service and/or message transport service as described below. The event publishing service and/or the message transport service may be configured to receive such events and provide them for processing by the policy management service. In an embodiment, the event publishing service may also provide the event records to the usage data service 116 for processing. The usage repository 114 may include records of previous access control usage requests such as the requests obtained from request logs 110, with such records filtered, aggregated, compressed, or otherwise processed as described herein. The records of previous access control usage requests which may be obtained from the request log may be referred to herein as "obtained information" or as "obtained information records" or simply as "records." As described above, the data may then be retrieved from the authorization data repository and used to, for example, improve authorization policies, generate warnings associated with policy changes, generate suggestions associated with policies, or other such activities associated with authorization policies as described in U.S. patent application Ser. No. 14/574,308, filed Dec. 17, 2014, entitled "ACCESS CONTROL POLICY WARNINGS AND SUGGESTIONS," and as described in U.S. patent application Ser. No. 14/574,328, filed Dec. 17, 2014, entitled "SELF-LEARNING ACCESS CONTROL POLICIES," which are incorporated by reference herein.

Figure 2:
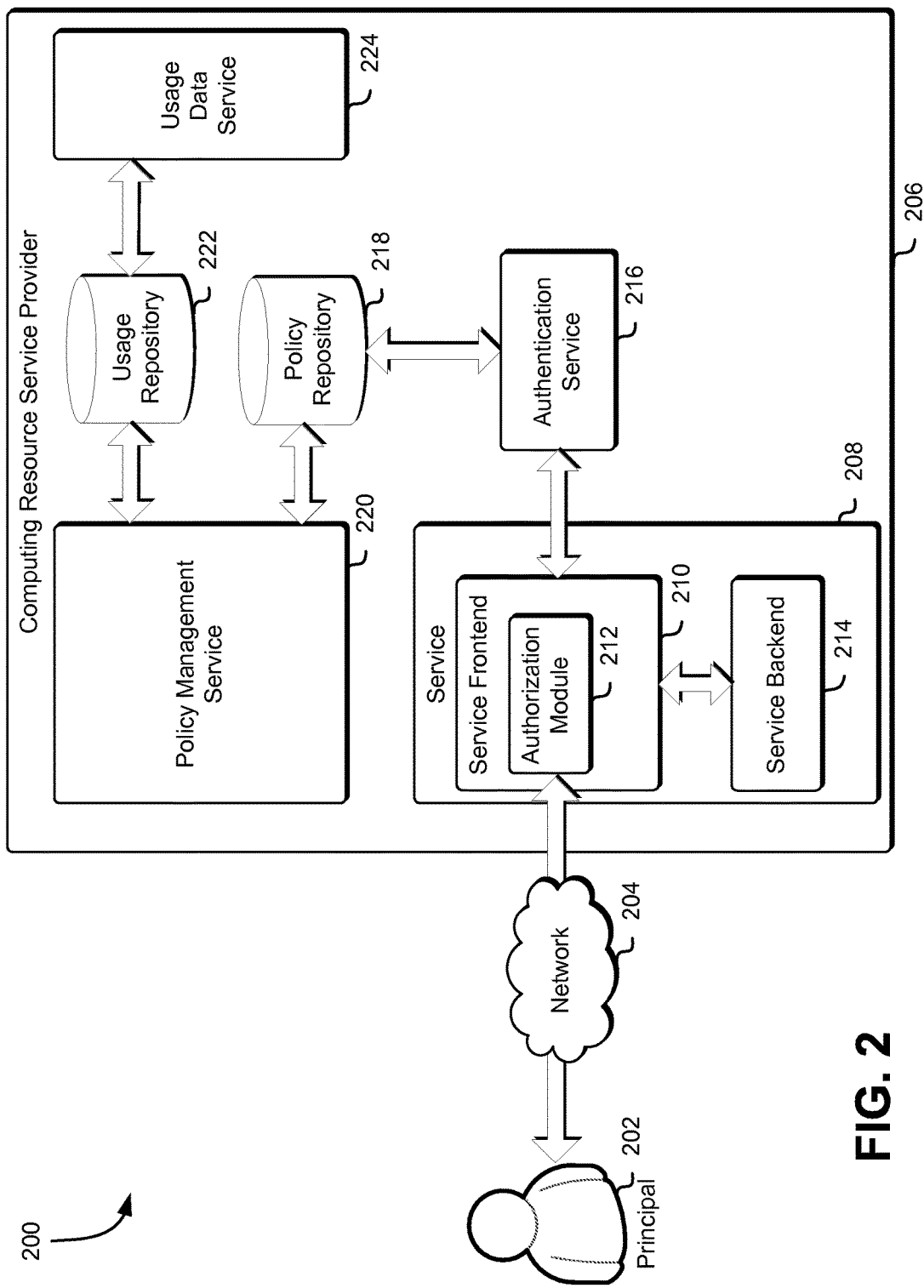
FIG. 2 illustrates an example environment in which access control policies may be managed in accordance with an embodiment.

FIG. 2 is an illustrative example of an environment 200 in which access control policies may be managed in accordance with an embodiment. Access control policies such as those illustrated in FIG. 2 may be used in collecting, processing, and/or aggregating usage data such as the usage data described herein in connection with FIG. 1. In an embodiment, a principal 202 may use a computing device to communicate over a network 204 with a computing resource service provider 206. Communications between the computing resource service provider 206 and the principal 202 may, for instance, be for the purpose of accessing a service 208 operated by the computing resource service provider 206, which may be one of many services operated by the computing resource service provider 206. The service 208 may comprise a service frontend 210 and a service backend 214. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, a service, or a process representing one or more of these entities that may be running on one or more remote (relative to the computing resource service provider 206) computer systems, or may be some other such computer system entity, user, or process. Each user, group, role, service, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 208 may be received by a service frontend 210, which, in some examples, comprises a web server configured to receive such requests and to process them according to one or more policies associated with the service 208. The request for access to the service 208 may be a digitally signed request and, as a result, may be provided with a digital signature. The service frontend 210 may then send the request and the digital signature for verification to an authentication service 216. The authentication service 216 may be a stand-alone service or may be part of a service provider or other entity.

As illustrated in FIG. 2, the authentication service 216 is shown separate from the authorization module 212. In an embodiment, the authentication service 216 may be combined with the authorization module 212 as an authorization and authentication module that may be configured to operate within a service such as the service 208. In an embodiment, the authentication service 216 may be combined with the authorization module 212 as an authorization and authentication service that may be configured to operate as a service and may be configured to receive and/or process requests from a service such as the service 208. As also illustrated in FIG. 2, the authentication service 216 is shown as a service provided by the computing resource service provider 206. In an embodiment, the authentication service 216 may be provided as a service by a third party where, for example, services such as the service 208 are also provided by a third party. In such embodiments, the authentication service may be configured to communicate with the policy repository 218 and/or with the policy management service 220 or the authentication service may be configured to communicate with a third party policy repository service and/or a third party policy management service. As may be contemplated, the positions and associations of an authorization module and/or an authentication service described herein are illustrative examples and other such positions and/or associations are considered as within the scope of the present disclosure.

The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202. However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate.

Upon successful authentication of a request, the authentication service 216 may then obtain policies applicable to the request. A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220. A policy management service 220 may provide access to, and administration of, policies applicable to requests for access to computing resources (e.g., web service application programming interface requests). For example, the policy management service may receive information sufficient for selecting policies applicable to pending requests. In some embodiments, the information may comprise copies of the requests, or may be information generated based at least in part on the requests. In another example, a service such as a service frontend 210 may receive a request for access to resources and may generate a query to the policy management service 220 based at least in part on information specified by the request.

The policy management service 220 may also obtain usage history associated with the policy and/or the permissions associated with the policy by transmitting a query to a usage repository 222. The usage repository may include records of previous access control usage requests as described herein in connection with FIG. 1. In an embodiment, a usage data service 224 such as the usage data service described herein may access the usage repository 222 to, for example, compress, filter, aggregate, or otherwise process the records in the usage repository 222. In such an embodiment, the usage data service may obtain data from the policy management service 220, or from the authentication service 216, or from other data sources.

The query to the policy repository 218 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request). The query to the usage repository 222 may be a request comprising information sufficient to determine past usage of permissions (i.e., requests for access managed by one or more permissions) associated with the set of policies. The query to the usage repository 222 may, for example, include copies of the policies and/or permissions, a copy of the request, parameters, and/or metadata associated with the policies, permissions, or request, and/or other such data and/or metadata. The policy repository 218 and/or the usage repository 222 may be databases or other systems operable to process queries. The policy repository 218 and/or the usage repository 222 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 216 may provide an authentication response and, if applicable, the obtained policies back to the service frontend 210. The authentication response may indicate whether the response was successfully authenticated. The service frontend 210 may then check whether the fulfillment of the request for access to the service 208 would comply with the obtained policies using an authorization module 212. An authorization module 212 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

Finally, if the fulfillment of the request for access to the service 208 complies with the applicable obtained policies, the service frontend 210 may fulfill the request using the service backend 214. A service backend 214 may be a component of the service configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

Figure 3:
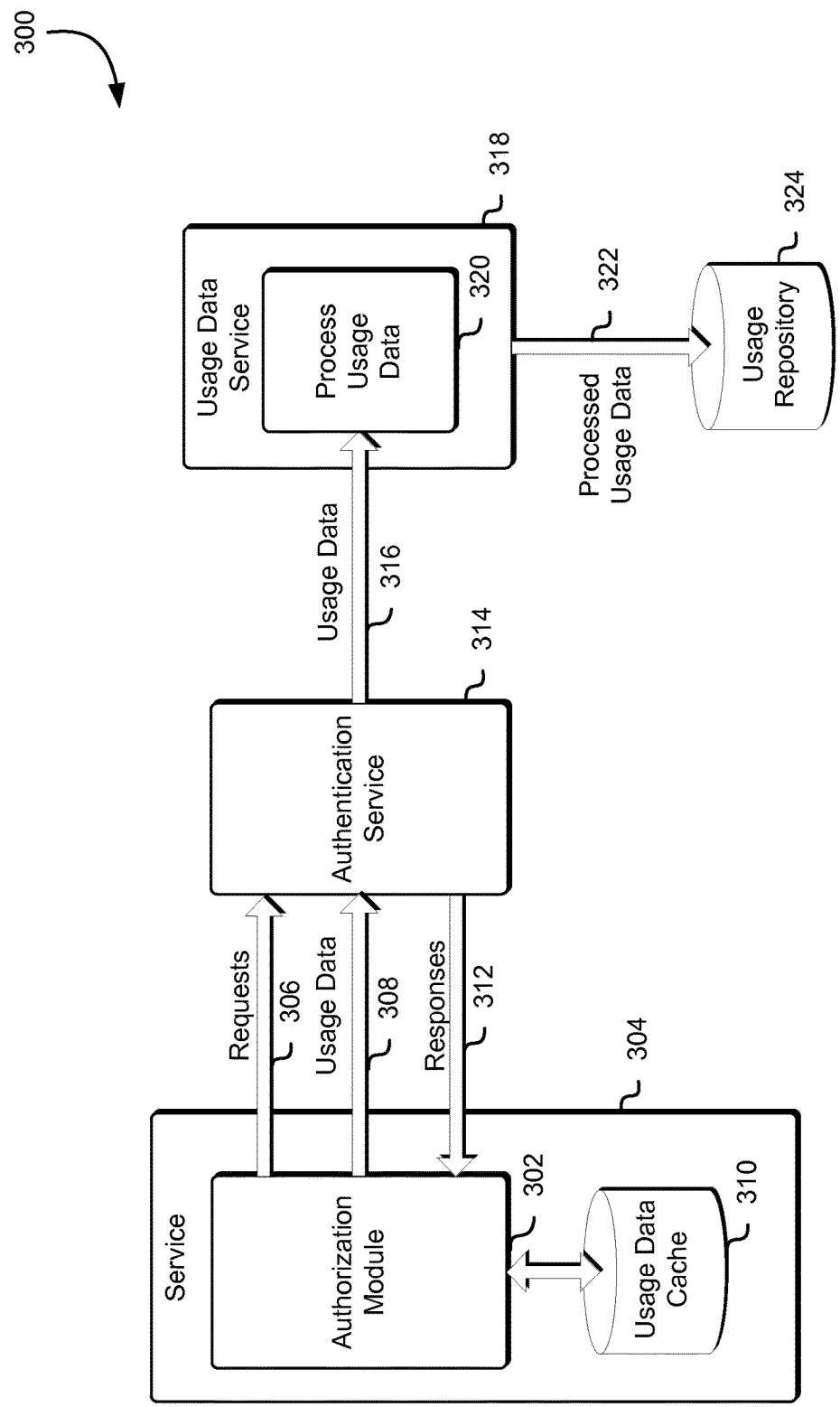
FIG. 3 illustrates an example environment in which an authorization module associated with a service may collect authorization data for aggregation in accordance with an embodiment.

FIG. 3 is an illustrative example of an environment 300 in which an authorization module associated with a service may be used to collect authorization data for aggregation and processing in accordance with an embodiment. An authorization module 302 associated with a service 304 such as the authorization module 212 described in connection with FIG. 2 may generate requests 306 for access to computer system resources and may receive responses 312 from an authentication service 314 as described herein. The authorization module 302 or a component associated with the authorization module 302 may also be configured to store usage data associated with those requests 306 and responses 312 in a usage data cache 310. The usage data cache 310 may be a local storage resource such as a disk or computer memory or may be a remote storage resource such as a network connected storage location. In some embodiments, the data stored in the usage data cache 310 may be the same as, or may be based at least in part on, log data created by the authorization module 302, which may be generated as part of the standard or typical operation of the authorization module 302.

In the example illustrated in FIG. 3, the authorization module 302 may also be configured to send usage data 308 associated with previous requests to the authentication service 314. Such usage data, which may include data such as the data and metadata described herein, may be stored in a usage data cache 310 and sent with subsequent requests, or may be sent separately as generated, or may be sent using a combination of such techniques. Usage data 308 sent to the authentication service with subsequent requests may be sent in a combined usage data structure that may include one or more usage data records with each subsequent request. In some embodiments, the authorization module may be configured to provide the usage data in response to a request from the authentication service 314. In some embodiments, the authorization module may send the send the usage data as it is gathered and not store the usage data in a usage data cache.

The usage data may be gathered as the service operates and provided throughout the life of the service. For example, when a service first starts up, there may be no previously stored usage data in the usage data cache 310. A first request for access to a computer system resource may be sent to the authentication service 314 and a response may be received to that request. The authorization module 302 may then store usage data related to that first request in the usage data cache 310 including, for example, the request and the response to the request. A second request for access to a computer system resource may then be sent to the authentication service and, in addition to the request, the usage data from the first request may be sent with the second request.

In some embodiments, the authorization module 302 may send the usage data 308 separately from the requests 306 and may, for example, send the usage data each time a record is completed, or when a determined number of usage data records have been received, or after a determined amount of time has pass, or according to some other criteria. The usage data may be sent once without determining whether the data has been received, or may be sent repeatedly until an acknowledgement is received. In some embodiments, the usage data may be sampled (e.g., every tenth record may be sent). In such embodiments, the sampling rate (also referred to herein as a "sampling criterion") may vary based at least in part on the nature of the usage. For example, access to more sensitive resources or access that uses more potentially damaging APIs may be sampled at a more frequent rate. The authorization module 302 may use the same connection that is used to send the requests 306 or may use a separately configured configuration. In some embodiments, the authorization module 302 or a component of the authorization module may be configured to perform one or more operations to process the usage data 308 before sending it to the authentication service including, but not limited to, filtering the usage data or compressing the usage data.

The authentication service 314 may provide the usage data 316 for further processing 320. The further processing 320 of the usage data 316 may be performed by the authentication service 314 or may be performed by a separate service such as a usage data service 318 as illustrated in FIG. 3. The further processing 320 of the usage data 316 may include additional operations to filter, aggregate, remove duplicates from, and/or compress the usage data before the processed usage data 322 is stored in the usage repository 324. It should be noted that, while the processing of the usage data is illustrated in 3 as occurring immediately prior to storage, the usage data may be processed several times prior to that including, but not limited to, when it is first gathered, when it stored in the usage data cache 310, before it is sent to the authentication service 314, when it is received at the authentication service 314, before it is sent to the usage data service 318, within the usage data service (as illustrated), before it is stored in the usage repository 324, or after it has been stored in the usage repository 324. Additionally, while not illustrated in 3, the usage data may be further processed before it is provided to one or more consumers as described below in connection with FIG. 7. As described above, the usage data 316 may be a subset of event records which may be records generated in response to the requests 306, and may be received by an event publishing service and/or message transport service. The event publishing service and/or the message transport service, as described below in connection with FIG. 7 may be configured to receive such events and provide them for processing by the usage data service 318.

Figure 4:
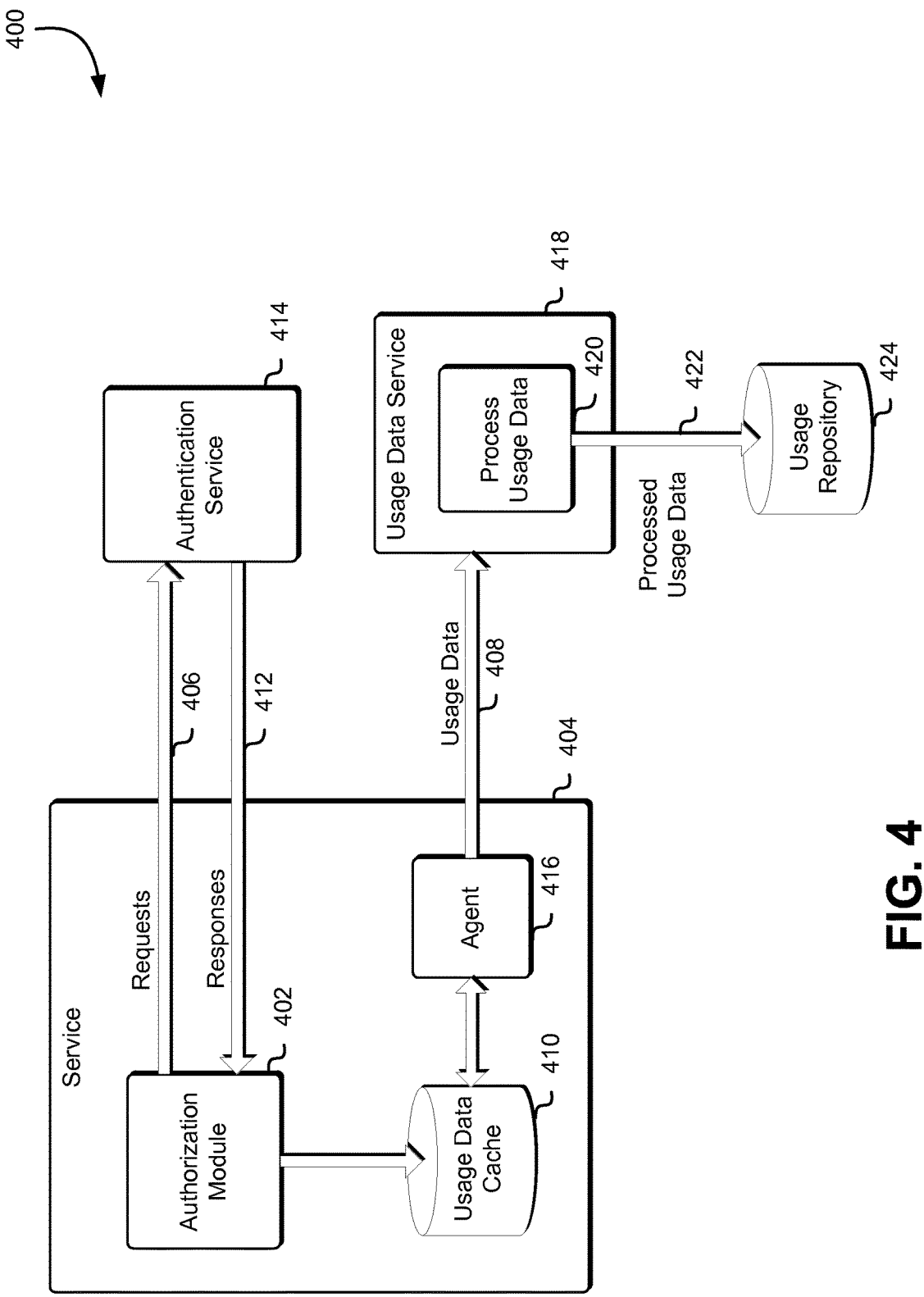
FIG. 4 illustrates an example environment in which an agent associated with a service may collect authorization data for aggregation in accordance with an embodiment.

FIG. 4 is an illustrative example of an environment 400 in which an agent associated with a service may be used to collect authorization data for aggregation in accordance with an embodiment. An authorization module 402 associated with a service 404 such as the authorization module 212 described in connection with FIG. 2 may generate requests 406 for access to computer system resources and may receive responses 412 from an authentication service 414 as described herein. The authorization module 402 or a component associated with the authorization module 402 may also be configured to store usage data associated with those requests 406 and responses 412 in a usage data cache 410 such as the usage data cache 310 described in connection with FIG. 3.

An agent 416 may then gather the usage data from the usage data cache 410, may perform one or more operations to process the usage data as described herein before sending the usage data 408 to a usage data service 418 such as the usage data service 318 described in connection with FIG. 3. The usage data service 418 may then perform operations to process the usage data 420 and store the processed usage data 422 in the usage repository 424 also as described in connection with FIG. 3. The agent 416 may be a program, process, module, or service configured to collect usage data from authorization module logs and/or from a usage data cache 410, to filter, aggregate, compress, or to otherwise process such usage data, and to send the usage data for further processing. An instance of the agent 416 may, for example, be instantiated with each service that includes an authorization module so that the usage data 408 may be provided for aggregation within the usage repository 424.

Figure 5:
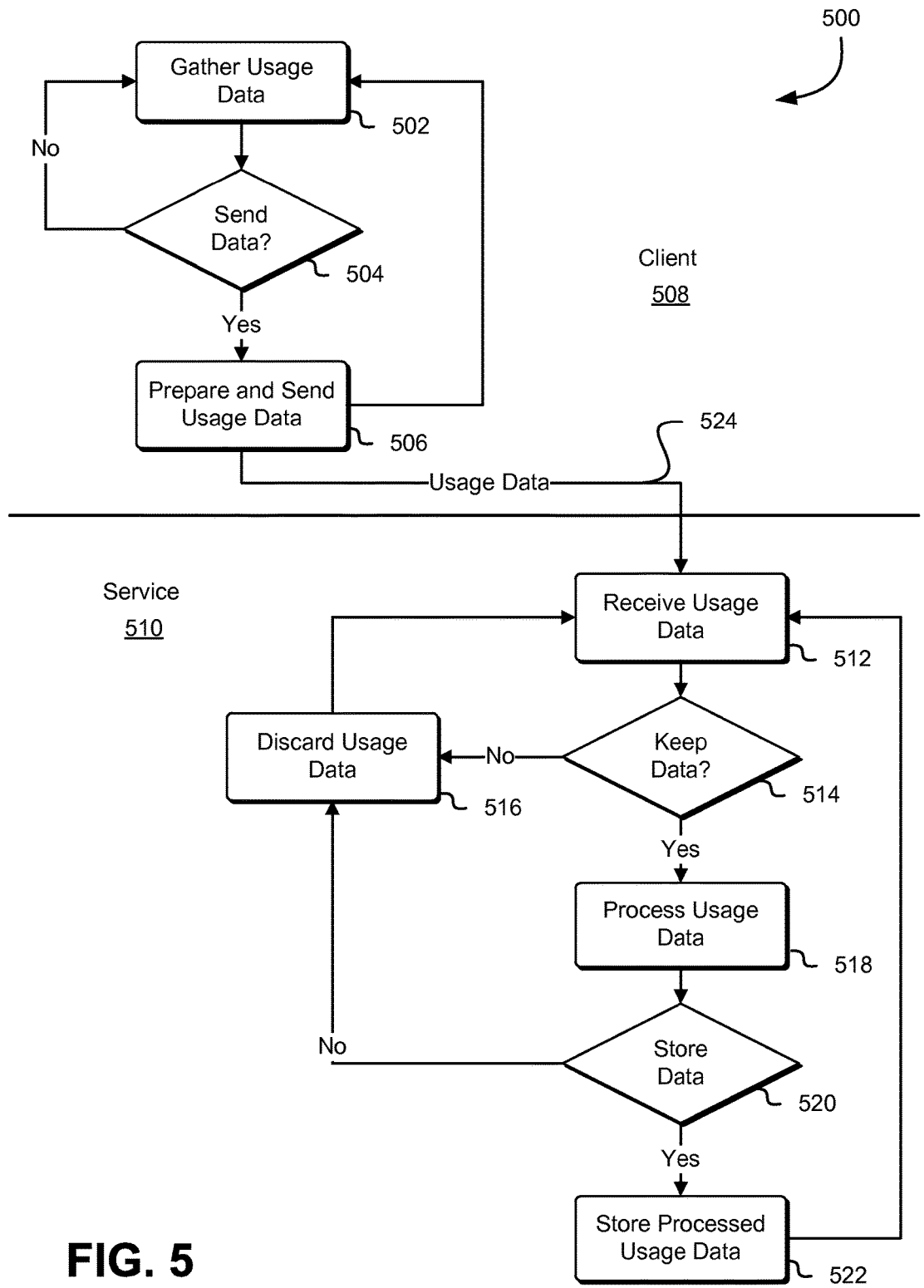
FIG. 5 illustrates an example process for collecting and aggregating authorization data in accordance with an embodiment.

FIG. 5 is an illustrative example of a process 500 for collecting and aggregating authorization data in accordance with an embodiment. In the example process 500 illustrated in FIG. 5, a client 508 associated with a principal such as the principal 202 described in connection with FIG. 2 or a component of such client such as, for example, an agent or a web server, may perform the first portion of the process 500 illustrated in FIG. 5. In the example process 500 illustrated in FIG. 5, a service 510 such as the policy management service 220 described in connection with FIG. 2 or a component thereof such as, for example, a web server may perform the second portion of the process 500 illustrated in FIG. 5. In some embodiments, a policy management service such as the policy management service 220 described in connection with FIG. 2 or a component thereof such as, for example, a web server may perform all of the process 500 illustrated in FIG. 5.

In the example process 500 illustrated in FIG. 5, a client 508 may first gather usage data 502 related to requests for access to computer system resources. The usage data may include request data such as the principal making the request and the resource associated with the request. The usage data may also include the result of the request (i.e., whether it was allowed or denied). The usage data may also include additional request data and/or metadata specifying how the result was generated. For example, the usage data may include the API and/or the API method used to generate the request, the time of the request, the conditions related to the request (as described herein), and the result of the request (i.e., whether the request was allowed or denied and why). The usage data may also include contextual information such as, for example, the internet protocol address of the requester and/or of the resource. Additionally, the usage data may include other information associated with generating the result including, but not limited to, a set of resource tags associated with the request, a set of policies a set of policies associated with the request, a set of contextual information associated with the request, an access control list associated with the request, a set of data loss prevention rules associated with the request, or a set of operations associated with producing the result. For example, a set of resource tags may be associated with the resource implicated by the request that indicate rules for accessing the resource. Such resource tags may be used to allow or deny a request, and in that event, the resource tags used to generate the result may be included in the set of usage data. In an embodiment, the procedure used in evaluating the set of resource tags to generate the result may be included in the set of operations associated with producing the result indicating how the request was fulfilled.

In some embodiments, the time of the request can be stored with the request or it can be inferred later in the processing of the request. In some embodiments, the result of the request may not be known at the time of the request and may be added to the usage data at a later point in the process. The request data records (i.e., the records containing the request data) may also include one or more policies that were in effect at the time that the request was made and/or an authorization context associated with a request. An authorization context may contain data related to other factors associated with the request. For example, a request for access to a resource may be allowed or denied based on access to several other resources, some of which may be sensitive and some of which may not be sensitive (e.g., secure networks versus unsecure networks). An authorization context may include data and/or metadata associated with those other resources. The usage data may be stored in one or more data structures associated with each aspect of the usage data including, but not limited to, request data records, request metadata, resource data, or other such aspects of the usage data.

The client 508 may then perform one or more operations to determine whether to send 504 some or all of the usage data for further processing by the service 510. Such data may, for example, be temporarily stored in a location accessible by the client 508 and/or it may be filtered to remove redundant or irrelevant data, flagged for various levels of importance, aggregated, compressed, or otherwise processed. For example, the filtering of data may include removing records entirely (i.e., sampling as described herein) or removing portions of records (i.e., removing fields from a record). In the event that it is determined to not send the usage data (or in the event that, once filtered, there is no data to send), the client 508 may then continue to gather usage data 502. In the event that the it is determined to send the usage data, the client 508 may then prepare and send 506 the usage data 524 to the service 510. The usage data 524 may be the gathered data or may be filtered, compressed, aggregated, and/or otherwise processed as described herein.

The service 510 may then receive 512 the usage data 524 and may, in some embodiments, perform one or more operations to preliminarily filter the data to remove redundant or irrelevant data or to flag the data for various levels of importance so that it may be determined whether to keep 514 the usage data 524 or discard the usage data 524. In such embodiments, some or all of the usage data 524 may be discarded 516. Usage data 524 that is not discarded may then be processed 518. Processing may include operations including, but not limited to, operations to aggregate the usage data, remove duplicates from the usage data, add data to the usage data (such as, for example, filling in the time of the request and/or the result of the request), add metadata to the usage data (such as that described above or, for example, IP addresses, location of origin, secondary resources associated with the request, or other such metadata), compress the usage data, further filter the usage data, or other such operations. Next, the service 510 may determine 520 whether the processed usage data should be stored 522 or discarded 516 before the more usage data 524 is received by the service 510.

Figure 6:
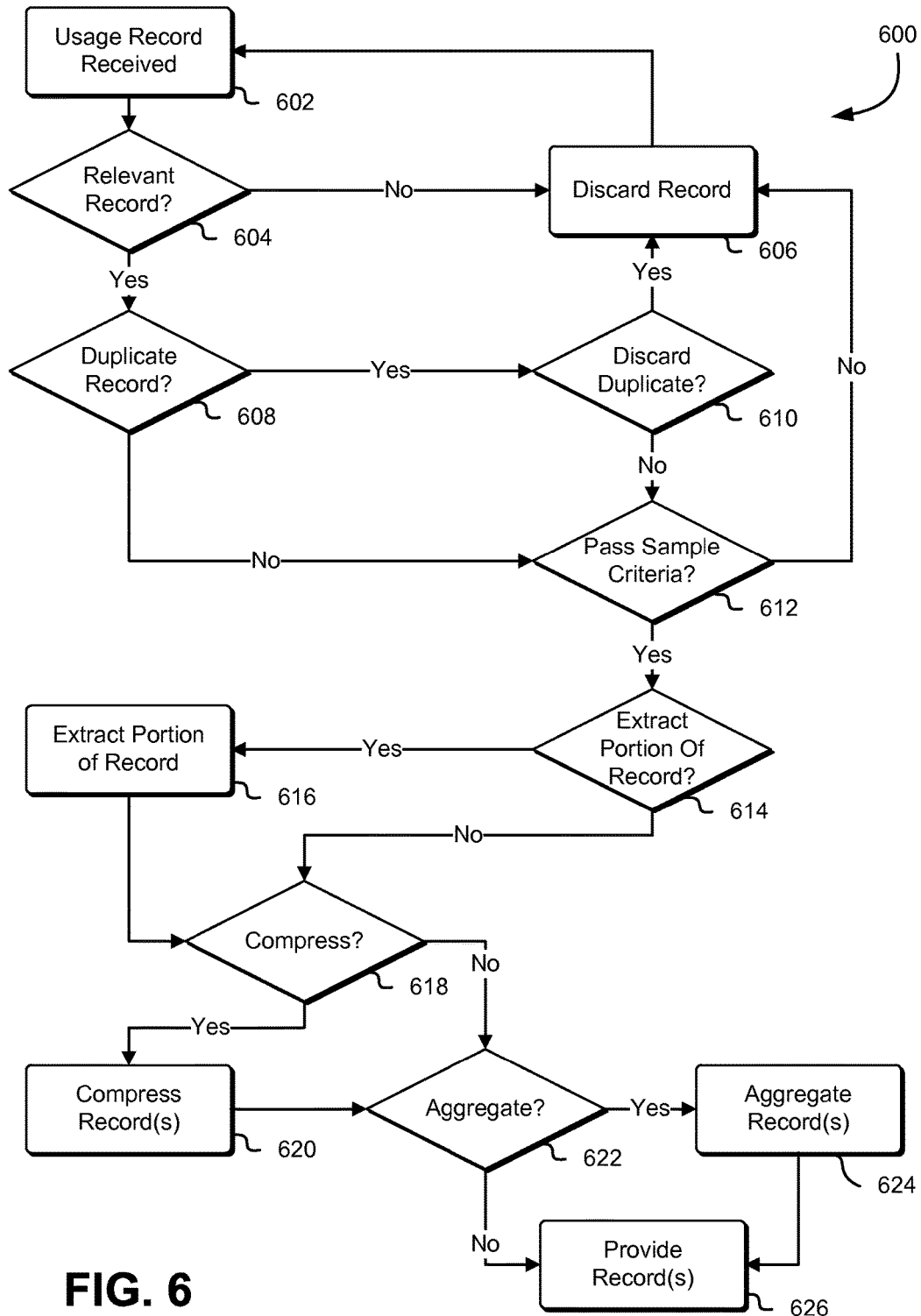
FIG. 6 illustrates an example process for processing and aggregating authorization data in accordance with an embodiment.

FIG. 6 is an illustrative example of a process 600 for processing and aggregating authorization data in accordance with an embodiment. A policy management service such as the policy management service 220 described in connection with FIG. 2, or a component thereof, such as the usage data service 318 described in connection with FIG. 3, may perform the process 600 illustrated in FIG. 6.

A usage record may be received 602 by the service. The usage record may be comprised of unprocessed usage data or may be comprised of processed data as described herein. The service may then perform one or more operations to filter the record. First, the service may determine whether the record is relevant 604 to the operation of the usage data service. For example, a record may be considered not relevant 604 if the record relates to usage of an unimportant resource, relates to a common usage profile, or does not contain any useful information. An example of a record that is not relevant 604 may a record of a request for a read from a temporary data store that does not contain data marked as sensitive but that contains, for example, temporary data associated with a service. In an embodiment, a customer of the usage data service may be provided with an interface to determine which records may or may not be relevant including a web interface and/or an API. For example, a customer may create a resource and designate that all requests associated with that resource are relevant for aggregation of usage data, or that no requests associated with that resource are relevant for aggregation of usage data, or that a subset of the requests associated with that resource (e.g., all read requests) are relevant for aggregation of usage data. In an embodiment, a computing resource service provider and/or some other service provider may also use such an interface or API to determine which records may or may not be relevant and may, for example, use such an interface to adjust the characteristics of the processes described herein.

If a record is determined not to be relevant 604, the record may be discarded 606. If the record is determined to be relevant 604, the service may then further filter the record based on whether the record is a duplicate record 608. A record may be determined to be a duplicate record 608 if the record is one of a plurality of records that are each the same or similar. For example, a large number of records associated with a request to write to a resource, all of which may be approved, may be generated as a result of a single write operation (i.e., a separate record may be generated to write each packet). In such an example, only one of the records may be retained by the service, while the rest of the records may be discarded. If a duplicate record 608 is found by the service, the service may first determine whether to discard any duplicate records 610 and if so, the record may be discarded 606.

If the record is not a duplicate record 608, or if the duplicate record is not discarded because, for example, the duplicate record is necessary, the service may next sample the records by determining whether the record passes one or more sample criteria 612. As described herein, sample criteria may be used to filter records by only retaining a subset of the set of records and discarding the remainder of the records. Such sample criteria may be used to reduce the amount of data sent for further processing, thereby reducing the amount of data stored in the usage repository. A sample criterion may be expressed as a sample threshold that, for example, causes the service to sample one percent of all records received. Such a sample threshold may also be adjusted to always allow (i.e., set to one-hundred percent) or to always deny (i.e., set to zero percent). As was described above, a customer of the usage data service may be provided with an interface to establish sample criteria using, for example, a web interface and/or an API. A sample threshold (or sample rate) may be expressed differently based on different criteria associated with the request. For example, the sample rate may be based on the service associated with the request, the account associated with the request, or the principal associated with the request. A sample rate may also be based on a set of preferences expressed by a user (or customer) of a service or by an owner (or administrator) of the service. Such preferences may be expressed using a configuration file, an interface such as an API, or using some other method of expressing such preferences. Similarly, a sample rate may be based on a configuration (i.e., an operation configuration) specified by a user and/or an owner. A sample rate may also be based on a security risk associated with requests for resources (i.e., a measure of how sensitive the resource and/or data associated with the resource is).

For example, a service may be configured perform frequent reads from a collection of data stores, each of which may generate a usage record. Such records may not be duplicates because, for example, they may access different resources and/or may utilize different credentials. However, it may be determined that a substantial portion of those usage records are similar and, as such, only a portion of those usage records may need to be sent for further processing. In such an example, a majority of the records may be discarded while only a small percentage may be retained. As described herein, different types of records may be sampled at different rates. For example, only a small percentage of usage records where the request for resources is allowed may be retained while a much larger percentage of usage records where the request for resources is denied may be retained. Sample criteria may be established per account, per user, per resource, per account type, per user type, and/or according to other classifications. For example, a service may use two resources with a first resource that is associated with sensitive data and a second resource that is not associated with sensitive data. Requests for access to the first resource may all pass the sampling criteria while requests for access to the second resource may only be sampled at a very low rate.

The service may then perform one or more operations to compress and/or otherwise reduce the data associated with usage records. First, the usage data service may determine whether to extract a portion 614 of the record and if so, may extract that portion of the record 616. A usage record may contain a great deal of data that is irrelevant to a usage data service. For example, a usage data record may comprise a set of fields including, for example, the principal, the resource, and the result. A usage data service may only require usage records to contain the principal, the resource, and the result and this may be the portion of the record that is extracted. In another example, the usage data service may require usage records to contain a larger subset of the usage data (i.e., including metadata associated with the request) and that larger subset of the usage data may be extracted. As with the parameters described above, the portion of the records extracted may be established using an interface such as a web interface or an API. The service may next determine 618 whether to compress 620 one or more records and/or may determine 622 whether to aggregate 624 one or more records before providing the records 626 for use or storage as described herein.

Records may be compressed or consolidated on storage and/or on retrieval. For example, records may be received and the data may be stored in a repository. Duplicate records may then be eliminated from the repository so that only unique records are stored. Such records may be consolidated using a consolidation time window to produce pre-consolidated sets of data. As an example of a consolidation time window, a resource may have a consolidation time window of four days. On the first, second, and third days, records may be stored in the repository and grouped by each day. On the fourth day, the records from the first three days may be consolidated into a single set of records from days one through four. On the fifth day, a new grouping of records may be stored for the fifth day, and records may be retrieved either for the fifth day or from the consolidated set of records from the first four days. Consolidation may also be based on different consolidation time windows (e.g., minutes, hours, months, etc.) and/or may also be based on other data and/or metadata associated with the usage data.

Records may also be aggregated by, for example, combining all records for a certain principal into a single record, combining all records for a single resource into a single record, or by some other such aggregation method. Combining records may, for example, replace a plurality of records (e.g., one thousand records) for the same access to the same resource with a single record requesting that access to that resource, and an indicator that the request occurred a plurality of times (e.g., one thousand times). Compression parameters (i.e., how to remove duplicates), consolidation parameters (i.e., consolidation windows), and aggregation parameters (how to combine records) may all be tunable by a customer of the usage data service and/or by a provider of the usage data service. In an embodiment, the parameters may be automatically tuned based on, for example, the amount of data, the performance of the usage data service, or some other such criteria. As may be contemplated, the operations to filter, compress, consolidate, or aggregate usage records described herein are illustrative examples and other such operations to filter, compress consolidate, or aggregate usage records are considered as within the scope of the present disclosure.

Figure 7:
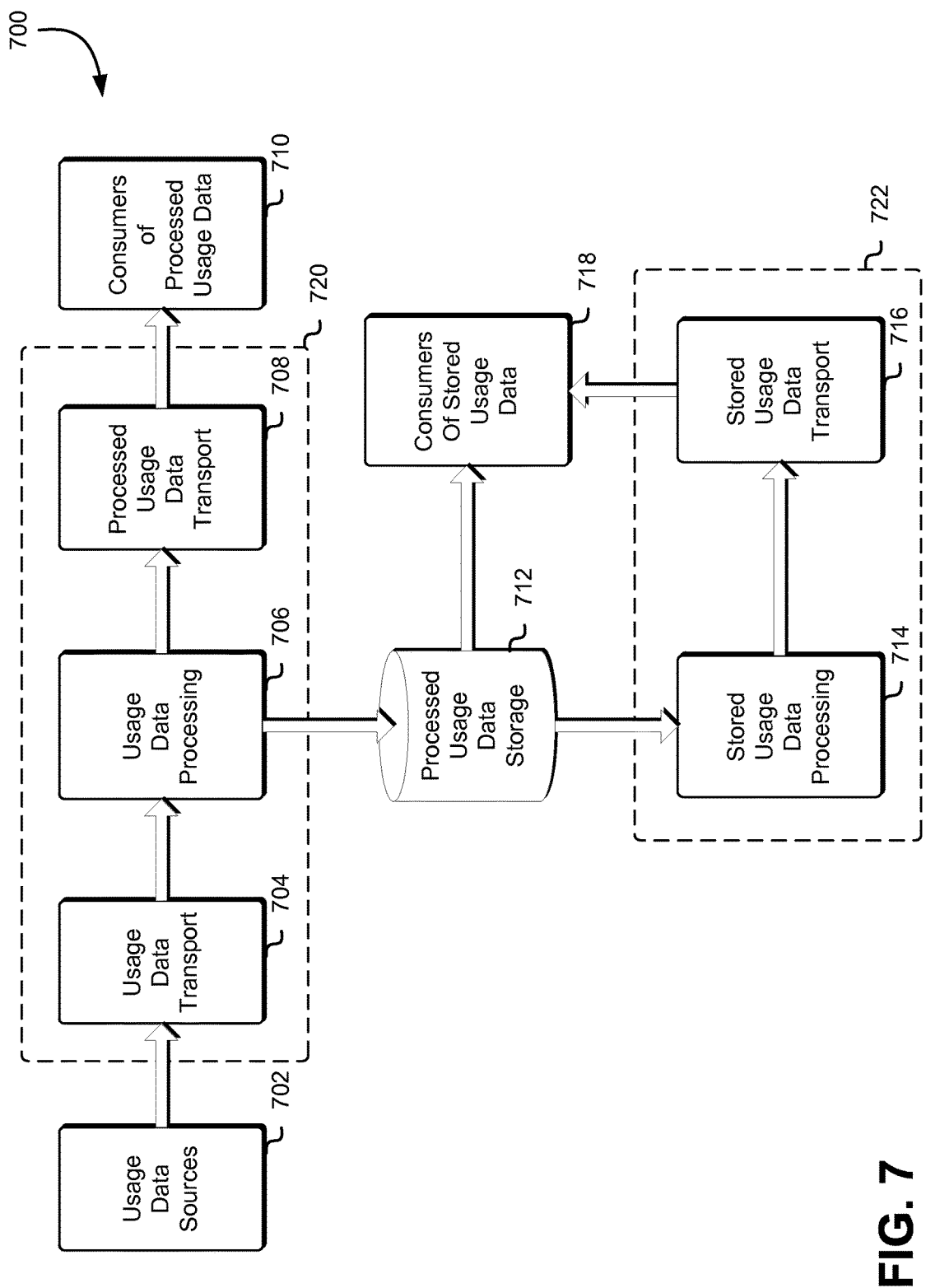
FIG. 7 illustrates an example data flow diagram in which authorization data is collected and processed in accordance with an embodiment.

FIG. 7 is an illustrative example of a data flow diagram 700 in which authorization data is collected and processed in accordance with an embodiment. Usage data sources 702 such as the services described herein may produce usage data records which may be transported via usage data transport 704 (i.e., via a network connection such as the Internet) for usage data processing 706 as described herein. The usage data may be transported using a data service such as, for example, a message transport bus, a message transport service, or a collection of message transport queues. The usage data may also be transported using a streaming data processing service which may provide the functionality of the usage data transport 704 and may also provide some or all of the functionality for the usage data processing 706 including, but not limited to, removing duplicate data, filtering data, sampling data, and/or compressing data.

The usage data may also be transported using an event publishing service (also referred to herein as an event queue service), which may also be configured to provide the functionality for the usage data processing 706 in addition to the functionality for the usage data transport 704. An event publishing service, which may be configured to receive event records generated as a result of events that may occur in association with the operation of a service and which may also be configured to provide access to all such event records associated with the service, may be used to provide usage data transport by configuring a subscriber or listener to receive only those event records associated with usage data. Such events may, for example, be stored in an event queue and processed as received. For example, a service may generate events associated with the starting the service, configuring the service, actions taken by a user in association with the service, resource requests made by the service, operations performed by the service, or stopping the service. These event records may be sent to the event publishing service and may, in some embodiments, be stored in an event queue. The event publishing service may make them available to event subscribers (i.e., clients of the event publishing service). A subscriber or listener may then be configured to listen to event records associated with resource usage to generate resource usage records. As indicated by the grouping 720, the usage data transport 704, the usage data processing 706, and the processed usage data transport 708 (described below) may be performed by a data service such as those described herein.

In an embodiment, the processed usage data may then be transported via processed usage data transport 708 and provided to one or more consumers of processed usage data 710 using one or more of the transport methods described herein. The consumers of processed usage data 710 may include data clients, data storage clients, data processing clients, or other such data consumers. An example of a processed usage data consumer is a service configured to detect usage data anomalies such as, for example, repeated attempts to access a sensitive resource and to generate alerts based upon detecting such anomalies. Such a consumer may not require storage of the usage data and may instead be configured to receive the processed usage data and analyze the usage data as it is received.

In another embodiment, the processed usage data may be stored in processed usage data storage 712 such as the usage repository 114 described in connection with FIG. 1. In such an embodiment, the processed usage data may be provided to one or more consumers of stored usage data 718 and/or may also be provided for additional stored usage data processing 714 and/or stored usage transport 716 before being provided to the one or more consumers of stored usage data 718. For example, the stored usage data may be indexed to facilitate rapid searches based on, a principal, a resource, a collection of principals, or other such data elements. As indicated by the grouping 722, the additional stored usage data processing 714 and/or stored usage transport 716 may also be performed by a data service such as those described herein.

Data may be indexed using an index that may be based on the type of data being indexed. For example, a date (or time) field in a usage data record may be used to index the data and/or select records based on a range of dates and times (i.e., a start time and an end time, or before a time, or after a time). By contrast, a mapping such as, for example, a hash map of principal name or identifier may also be used to index the data and/or selected records. In some embodiments, wild cards in indexes and/or multiple indices may be used to index and/or select data records. For example, wild cards and multiple indices may be used to select data records from a certain subset of a class of resources, created before a certain date, with requests associated with a collection of principals.

The stored usage data may also combined into usage patterns or usage profiles that may be used for further analysis. A usage pattern or usage profile may specify a pattern of previously received requests for access to resources. For example, every day a certain user may connect to a service, create ten new resources associated with that service, perform millions of transactions associated with those resources, transport the results of those transactions to a permanent storage resource, and then destroy the ten new resources. Such repeated activity may be combined into a usage pattern or profile and stored in the usage repository as, for example, a directed graph of such actions. With such a usage pattern stored, any deviations from that pattern may then be detected and possibly flagged for further analysis. Such usage patterns or profiles may be provided to consumers, transport layers, processors, transport layers, or data sources to improve generation, transport, and/or processing of usage data.

Other processing of the usage data may be performed including operations to prune and/or scale the data stored in the database based on, for example, the amount of the data stored, the age of the records, the sensitivity of the resources, the nature of the principal, or other such factors. Additionally, the data may be enriched when it is stored to add additional data and/or metadata to the usage data records such as the country of origin of a request, the IP address of the originating service, or other such data enrichments. Such data enrichments may be used to, for example, provide additional indexing functionality or to provide additional anomaly detection. For example, if a user typically makes a series of requests for access to a sensitive resource from the same location, a series of requests from a different location may be an indication of an anomaly and a possible indication of a malicious attack.

Additional processing of data may also occur prior to transporting the data as described herein to, for example, compress the data for more efficient transport. The data may be compressed prior to being sent for processing and may also be compressed prior to being provided to consumers. In an embodiment, the data may be compressed using a static dictionary, or an enumerated list of combinations of principals, resources, and actions, or a hash map based on principals, resources, or actions, or some other such compression methodology.

Figure 8:
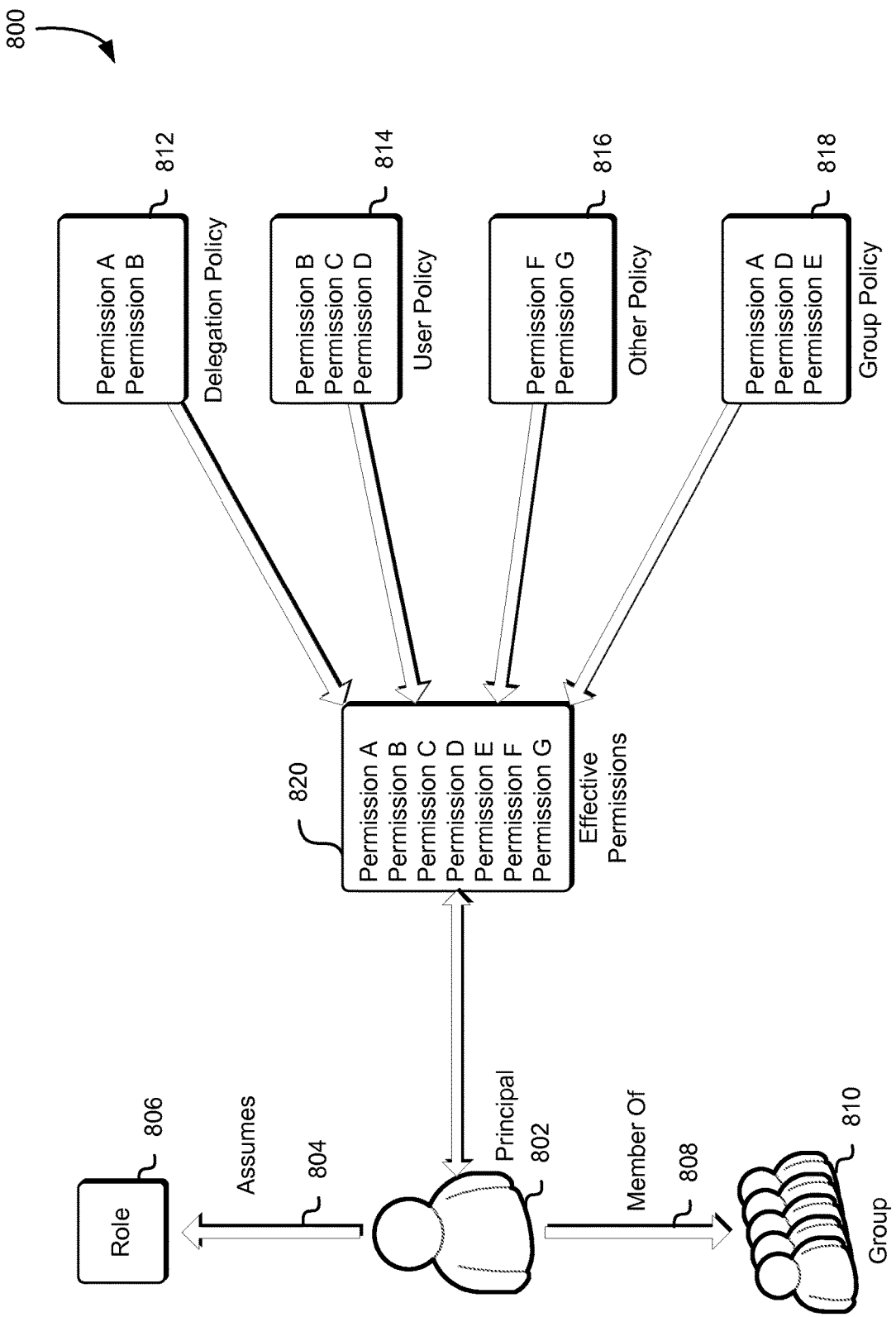
FIG. 8 illustrates an example diagram in which permissions associated with access control policies may be consolidated and altered in accordance with an embodiment.

FIG. 8 is an illustrative example of a diagram 800 illustrating relationships between various aspects of the present disclosure in which permissions associated with access control policies may be consolidated in accordance with an embodiment. Permissions associated with access control policies such as those illustrated in FIG. 8 may be used in collecting, processing, and/or aggregating usage data such as the usage data described herein in connection with FIG. 1. A principal 802 such as the principal 202 described herein in connection with FIG. 2 may have a set of effective permissions 820, which may be an aggregate of the permissions granted by one or more policies associated with that principal's access to computing resources. The set of effective permissions 820 may specify a plurality of permissions which detail resources the principal 802 may access, which resources the principal 802 may not access, and under which conditions access to those resources may be allowed (or granted) or denied. For example, a set of effective permissions may include one or more permissions that are associated with the principal, and one or more permissions that come from a different source such as, for example, a group policy, a delegation policy, roles assumed by the principal, organizational policies, or default policies. With respect to a policy, the policy's effective permissions may be those permissions that the policy explicitly or implicitly defines. For instance, a policy may explicitly grant a principal a set of permissions to perform a set of actions in connection with a resource. As another example, a policy may implicitly grant permissions to principals by granting permissions to a group (of which the principals are a member). The effective permissions of a policy may change over time. For example, a policy may be a role policy and principals able to assume the role may change over time despite the policy remaining static. As a result, effective permissions may change as the principals authorized to assume the role change. In other words, an effective permission is an access right of a principal to perform an action on a resource. A policy may grant effective permissions explicitly (i.e., by specifying the principal, the action, and the resource) and/or implicitly (i.e., by specifying the permissions in a way that leaves one or more of the principal, action, or resource unspecified explicitly).

In an embodiment where a default policy is to deny access to resources, the permissions may specify which resources are allowed. In an embodiment where the default policy is to allow access to resources, the permissions may specify access to the resources which are not explicitly denied. In an embodiment with some other default policy, the permissions may specify a combination of allowed and denied resource access. In some embodiments, the set of effective permissions 820 may be an aggregation of permissions for a particular resource and/or class of resources. In some embodiments, the set of effective permissions 820 may be an aggregation of permissions for multiple resources (e.g., an aggregation of permissions associated with all resources managed by a service for the user, an aggregation of permissions associated with a user account, or some other aggregation of permissions).

The set of effective permissions 820 may specify a combination or aggregation of permissions based on aspects of the principal. For example, if the principal 802 is a user, then the set of effective permissions 820 may specify one or more user policy permissions 814. User policy permissions 814 may include permissions related to the type of the principal 802 (i.e., a "user," a "group," or an "organization") and may also include permissions associated with a specific set of credentials associated with the identity of the principal 802.

In addition to permissions related to the class and/or the identity of the principal 802, the set of effective permissions 820 may specify one or more delegation policy permissions 812 as a result of the principal 802 assuming 804 one or more roles 806 specified within an organization. As an example, a principal 802 may be a software developer and may assume 804 a software developer role in his or her day-to-day activities and may become an authorized delegate for the set of permissions associated with assuming the software developer role. A software developer role may specify a set of delegation policy permissions 812 that are included in the set of effective permissions 820 associated with the principal 802. There may be some overlap in the user policy permissions 814 and the delegation policy permissions 812 (e.g., "Permission B"). There may also be conflicts between the user policy permissions 814 and the delegation policy permissions 812. For example, "Permission A" in delegation policy permissions 812 may grant access to a resource at all times, while "Permission C" in user policy permissions 814 may deny such access. In the event of such conflicts, a default policy and/or a default policy conflict resolution standard may prevail (i.e., to prefer denial or to prefer granting).

Similarly, the set of effective permissions 820 may specify one or more group policy permissions 818 as a result of a principal 802 being a member of 808 one or more groups 810 (e.g., a production group). The set of effective permissions 820 may also specify one or more other policy permissions 816 such as those associated with default policies, organizational policies, policies associated with certain applications, policies associated with heightened security conditions, temporary polices, or other such policies.

A principal 802 may also assume multiple roles, and thus multiple sets of role policy permissions. For example, the principal 802 that assumes a software developer role in his or her day-to-day activities may, at some point during his or her day, need more permissions such as those which may be associated with a system administrator role. In such an example, the principal may temporarily assume a system administrator role, perform one or more privileged operations granted by that role, and then may release that role, thereby returning his or her policy to the less privileged set of permissions. As may be contemplated, the types of roles and the associated permissions described in association with those roles are illustrative examples and other types of roles and associated positions are considered as within the scope of the present disclosure.

Permissions associated with the set of effective permissions 820 may be altered for the principal 802 by adding and/or removing permissions (i.e., as a result of API calls to a policy management service) from the delegation policy permissions 812, from the user policy permissions 814, from the group policy permissions 818, from the other policy permissions 816, or from other such groups of permissions. For example, removing "Permission E" from the set of effective permissions 820 may be accomplished by removing that permission from the group policy permissions 818. Such a removal may also remove that permission from any other principals who are members of that group which may or may not be a desirable effect. Redundant permissions may be removed from a policy. For example, users with user policy permissions 814 and with delegation policy permissions 812 have "Permission B" granted by both policies and as such, "Permission B" may be removed from either delegation policy permissions 812 or user policy permissions 814 without altering the permissions in the set of effective permissions 820. In both of these examples, other policy modification actions may also accomplish the same result (e.g., altering group membership and/or role assignments as described herein).

For example, the principal may be removed from the group (rather than altering the permissions of the group) and, because in the example illustrated in FIG. 8, "Permission A" and "Permission D" are granted by other policy permissions, the result would be to remove "Permission E" from the principal without altering the permissions of other principals. Similarly, permissions for a principal may be altered by adding the principal to a new group with different permissions (i.e., a newly created and/or previously specified group), assuming and/or releasing roles from the principal, altering roles, splitting groups based on the principals and/or the desired permissions, or other such actions. For example, a group may have ten members and may grant five permissions. Five of the group members may be suited to having the first four permissions and five of the group members may be suited to having the last three permissions. Splitting this group into two groups, each of which has the appropriate permissions and then making the appropriate principals members of the appropriate groups may make the permissions more optimal for each of the members.

Figure 9:
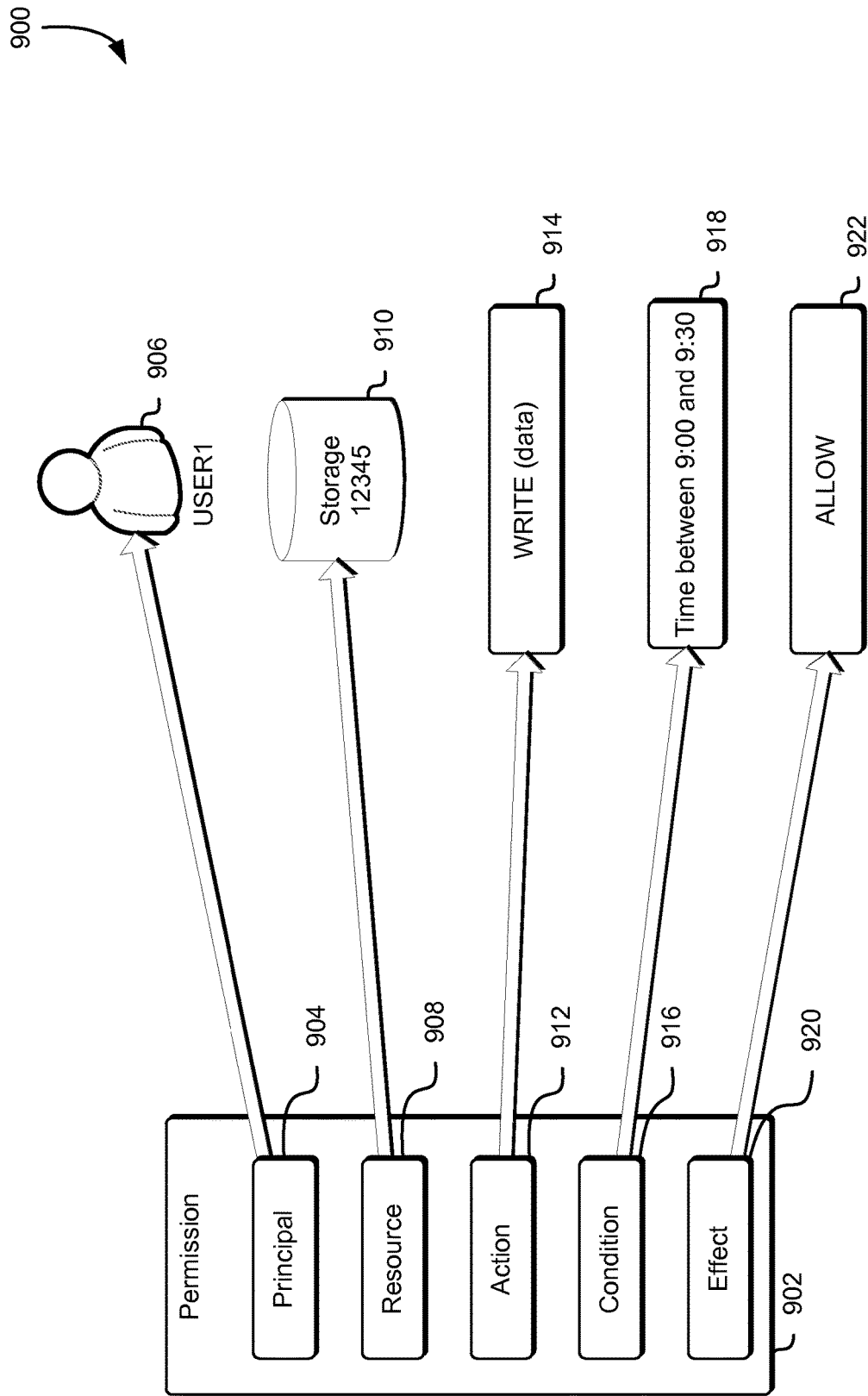
FIG. 9 illustrates an example diagram in which a permission associated with an access control policy is illustrated in accordance with an embodiment.

FIG. 9 is an illustrative example of a diagram 900 illustrating relationships between various aspects of the present disclosure in which a permission associated with an access control policy is illustrated in accordance with an embodiment. A permission associated with an access control policy such as the permission illustrated in FIG. 9 may be used in collecting, processing, and/or aggregating usage data such as the usage data described herein in connection with FIG. 1. In an embodiment, a permission 902 may specify a principal 904, a resource 908, an action 912, a condition 916, and an effect 920. In some embodiments, a permission may also specify a plurality of one or more of these elements such as, for example, a set or class of users, a collection of resources, several different actions, and/or multiple conditions.

The principal 904 may be a user, a group, an organization, a role, or a collection and/or combination of these or other such entities. A principal 904 may be any entity that is capable of submitting API calls that cause an action associated with a resource to be performed and/or any entity to which permissions associated with a resource may be granted. In the example permission 902 illustrated in FIG. 9, the principal 904 is a user 906 identified as "USER1." The action 912 may be any action that may be performed in association with the resource and may, for example, be identified by a type of API call, a library call, a program, process, a series of steps, a workflow, or some other such action. For example, an action may be a set of operations that may be performed as part of the fulfillment of an API call to, for example, a webservice. The actions that are performed may be a subset of those actions and/or may be a single operation. The operations may also be performed in a defined order, may be repeated, or may be shared between a plurality of API calls. In the example permission 902 illustrated in FIG. 9, the action is an API call to write data to the resource. The permission 902 illustrated in FIG. 9 may be one of a plurality of permissions specified by user policy permissions, such as those described in connection with FIG. 8. The example permission 902 illustrated in FIG. 9 further specifies a storage resource 910 for the resource 908, a data write API call 914 for the action 912, a time condition 918 for the condition 916, and an ALLOW effect 922 for the effect 920. The example permission thus specifies that "USER1 is ALLOWED to WRITE to 12345 between 9:00 AND 9:30 AM."

Figure 10:
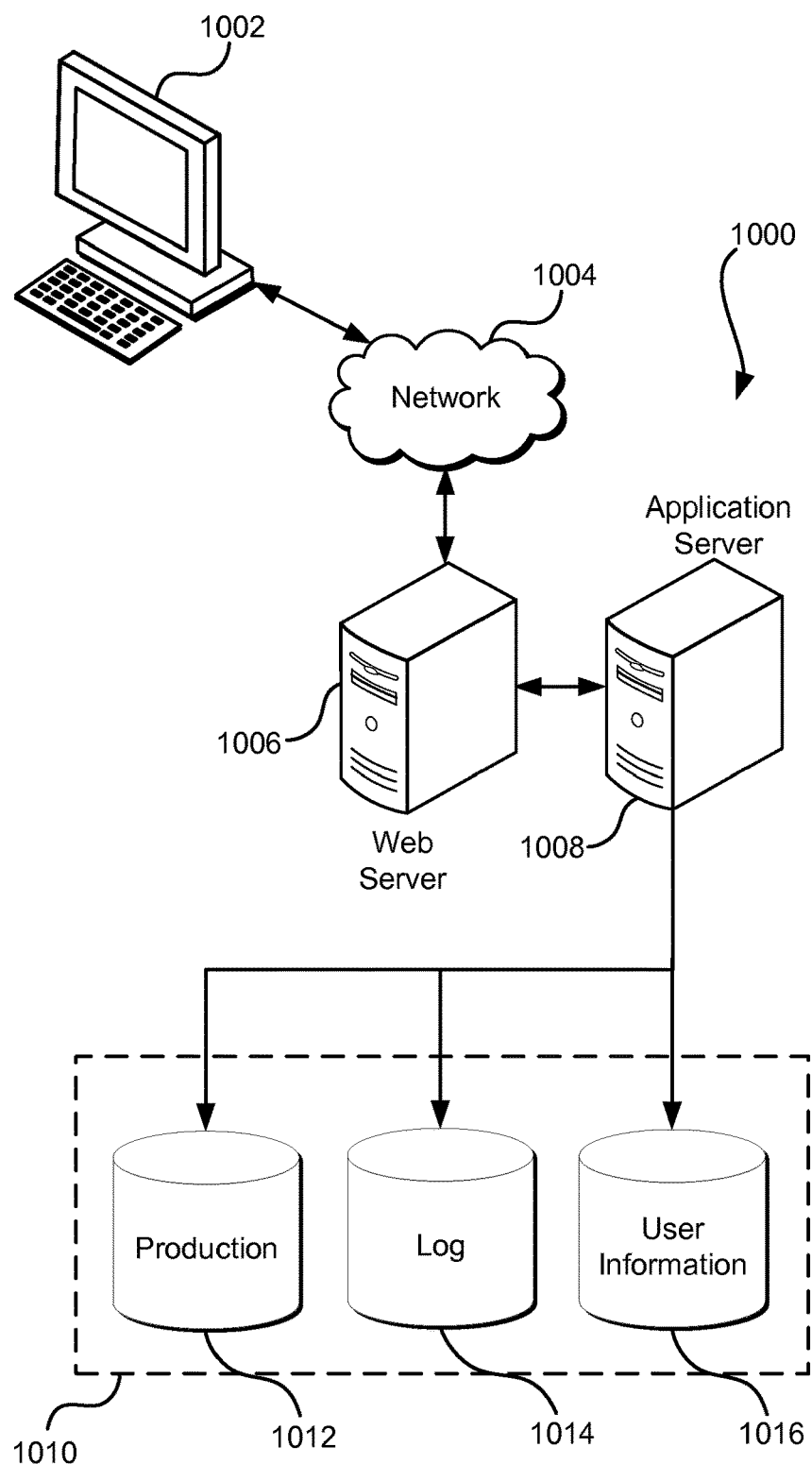
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a sampled set of usage data records, the sampled set of usage data records selected from a set of usage data records according to a sampling rate, each usage data record of the sampled set of usage data records specifying a respective request for access to one or more resources provided by a computing resource service provider, each respective request comprising a set of request data that includes a result indicating whether the request was fulfilled, wherein the sampling rate is based at least in part on at least one of: a service associated with the request, an application programming interface associated with the request, a principal associated with the request, a set of preferences expressed by a user associated with the one or more resources, a first configuration expressed by a customer of the computing resource provider, a second configuration expressed by an administrator of the computing resource provider, or a security risk associated with the request;
generating a set of aggregate usage records, each aggregate usage record of the set of aggregate usage records generated by combining a respective selected subset of usage records from the sampled set of usage records, the respective selected subset chosen based at least in part on one or more common permissions of a set of permissions implicated by the request;
storing the set of aggregate usage records in a usage data repository; and
providing, in response to an application programming interface request, a consolidated set of aggregate usage records from the usage data repository, the consolidated set of aggregated usage records selected based at least in part on the application programming interface request.

2. The computer-implemented method of claim 1, further comprising:
    determining a usage profile based on the consolidated set of aggregate usage records, the usage profile at least specifying a pattern of previously received requests for access to the one or more resources provided by the computing resource service provider; and
    providing the usage profile to a customer of the computing resource service provider.

3. The computer-implemented method of claim 1, wherein storing the set of aggregate usage records further comprises calculating a respective index associated with each aggregate usage record of the set of aggregate usage records, the respective index calculated based at least in part on the set of permissions.

4. The computer-implemented method of claim 3, wherein the consolidated set of aggregated usage records is selected based at least in part on the respective index.

5. The computer-implemented method of claim 1, wherein the set of request data further includes a set of metadata associated with the request, the set of metadata at least indicating how the request was fulfilled and including information specifying at least one of: a set of resource tags associated with the request, a set of policies associated with the request, a set of contextual information associated with the request, an access control list associated with the request, a set of data loss prevention rules associated with the request, or a set of operations associated with producing the result indicating whether the request was fulfilled.

6. The computer-implemented method of claim 1, wherein storing the set of aggregate usage records in a usage data repository comprises:
    receiving the set of aggregate usage records;
    selecting, based at least in part on a first set of aggregate usage records previously stored in the usage data repository, a subset of the set of aggregate usage records;
    consolidating the set of aggregate usage records with a second set of aggregate usage records previously stored in the usage data repository to produce a consolidated set of aggregate usage records; and
    storing the consolidated set of aggregate usage records in the usage data repository.

7. The computer-implemented method of claim 6, wherein consolidating the set of aggregate usage records with a second set of aggregate usage records is based on a consolidation time window.

8. A system, comprising at least one computing device configured to implement one or more services, wherein the one or more services are configured to:
    receive a sampled set of usage data records, the sampled set of usage data records selected from a set of usage data records according to a sampling rate, each usage data record of the sampled set of usage data records specifying a respective set of requests for access to a first set of resources provided by a computing resource service provider by a respective customer of the computing resource service provider, each request of the respective set of requests at least indicating a set of permissions implicated by the request, wherein the sampling rate is based at least in part on at least one of: a service associated with the request, an application programming interface associated with the request, a principal associated with the request, a set of preferences expressed by a user associated with the first set of resources, a first configuration expressed by a customer of the computing resource provider, a second configuration expressed by an administrator of the computing resource provider, or a security risk associated with the request;
    aggregate the sampled set of usage data records based at least in part on one or more permissions of the set of permissions to produce a set of aggregated usage records;
    select one or more subsets of the set of aggregated usage records, each selected subset of the set of aggregated usage records selected based at least in part on one or more common permission elements of the set of permissions implicated by the request; and
    provide the one or more subsets of the set of aggregated usage records.

9. The system of claim 8, wherein the sampled set of usage data records is received as a combined usage data structure, the combined usage data structure comprising the set of usage data and a set of subsequent requests for access to a second set of resources provided by the computing resource service provider.

10. The system of claim 9, wherein the system comprises an authentication service configured to produce the combined usage data structure by combining the set of usage data and the set of subsequent requests.

11. The system of claim 8, wherein the one or more services configured to aggregate the sampled set of usage data records are further configured to filter the set of usage data records to produce a filtered set of usage data records, the filtered set of usage data records selected from the set of usage data records based at least in part on the set of permissions.

12. The system of claim 8, wherein the one or more services configured to aggregate the sampled set of usage data records are further configured to store an aggregated set of usage data records in a usage data repository.

13. The system of claim 8, wherein the one or more services configured to aggregate the sampled set of usage data records are further configured to determine one or more respective metadata elements associated with each usage data record of the sampled set of usage data records, the one or more metadata elements including at least one of: a date associated with the respective set of requests, a time associated with the respective set of requests, a location associated with the respective set of requests, or a security risk associated with the respective set of requests.

14. The system of claim 13, wherein each subset of the set of aggregated usage records is selected based at least in part on the respective metadata elements.

15. A non-transitory computer-readable storage medium having stored thereon executable instructions that, as a result of execution by one or more processors of a computer system, cause the computer system to at least:
    receive a sampled set of event records associated with the computer system, the sampled set of event records selected from a set of event records according to a sampling rate, each event record of the sampled set of event records generated as a result of an event associated with the computer system, each event record of the sampled set of event records at least specifying the event, wherein the sampling rate is based at least in part on at least one of: a service associated with the event, an application programming interface associated with the event, a principal associated with the event, a set of preferences expressed by a user of the computer system, a first configuration expressed by a customer of the computer system, a second configuration expressed by an administrator of the computer system, or a security risk associated with the event;

select a subset of usage data records from the sampled set of event records, each usage data record of the subset of usage data records specifying a respective set of requests for access to a set of computer system resources, each respective request comprising a set of request data, the set of request data at least indicating a set of permissions implicated by the respective request, the subset of usage data records selected based at least in part on the set of request data;

aggregate the subset of usage data records based at least in part on one or more permissions of the set of permissions to produce a set of aggregated usage records; and store the set of aggregated usage records in a usage data repository.

16. The non-transitory computer-readable storage medium of claim 15, wherein the instructions further comprise instructions that, as a result of execution by the one or more processors, cause the computer system to provide, in response to an application programming interface request, a subset of the set of aggregated usage records, the subset of the set of aggregated usage records selected based at least in part on one or more common permission elements of the set of permissions implicated by the request.

17. The non-transitory computer-readable storage medium of claim 15, wherein the instructions that cause the computer system to select the subset of usage data records from the sampled set of event records further comprise instructions that, as a result of execution by the one or more processors, cause the computer system to remove duplicate usage data records from the subset of usage data records based at least in part on one or more common permissions of the set of permissions.

18. The non-transitory computer-readable storage medium of claim 15, wherein the instructions that cause the computer system to receive the set of event records associated with the computer system further comprise instructions that, as a result of execution by the one or more processors, cause the computer system to:
publish the sampled set of event records using an event publishing service; and
process the published sampled set of event records to select the subset of usage data records from the sampled set of event records based at least in part on the set of permissions.

19. The non-transitory computer-readable storage medium of claim 15, wherein the instructions that cause the computer system to receive the sampled set of event records associated with the computer system further comprise instructions that, as a result of execution by the one or more processors, cause the computer system to:
insert each event record of the sampled set of event records into an event queue; and
select the subset of usage data records from the event queue based at least in part on the set of permissions.

20. The non-transitory computer-readable storage medium of claim 15, wherein the set of request data comprises a set of request data records, each request data record of the set of request data records specifying at least one of: a principal associated with the request, a resource associated with the request, an action associated with the request, or a result associated with the request.

21. The non-transitory computer-readable storage medium of claim 15, wherein the set of request data comprises a set of metadata associated with the request specifying information associated with a user of the computer system.

22. The non-transitory computer-readable storage medium of claim 15, wherein the instructions further comprise instructions that, as a result of execution by the one or more processors, cause the computer system to remove a subset of the set of aggregated usage records from the usage data repository, the subset selected based at least in part on a respective date associated with each aggregated usage record of the set of aggregated usage records.

* * * * *